US005110337A

United States Patent [19]

Lisec

[11] Patent Number: 5,110,337

[45] Date of Patent: May 5, 1992

[54] METHOD AND APPARATUS FOR FILLING THE INNER SPACE OF SEMIFINISHED INSULATING GLASS PANELS WITH GAS

[76] Inventor: Peter Lisec, Bahnhofstrasse 34, A-3363 Amstetten-Hausmening, Austria

[21] Appl. No.: 597,765

[22] Filed: Oct. 15, 1990

[30] Foreign Application Priority Data

Feb. 28, 1990 [AT] Austria .................................. 473/90

[51] Int. Cl.[5] ........................ C03B 23/24; B65B 31/04

[52] U.S. Cl. ........................................ 65/58; 65/32.2; 65/152; 65/270; 141/4; 141/59

[58] Field of Search .................. 65/32.2, 58, 152, 270; 141/4, 5, 7, 59; 52/171, 172

[56] References Cited

U.S. PATENT DOCUMENTS 2,756,467 7/1956 Etling .
3,683,974 8/1972 Stewart et al. .................... 65/58 X
3,811,484 5/1974 Engelbrecht .......................... 141/7
4,061,163 12/1977 Decker et al. .......................... 141/7
4,450,660 5/1984 Dean et al. ...................... 52/172 X
4,827,992 5/1989 Mörsky et al. .................... 141/4 X
4,921,022 5/1990 Lisec ................................ 141/59 X

FOREIGN PATENT DOCUMENTS 368985 11/1982 Austria .
2956/87 11/1987 Austria .
385499 4/1988 Austria .
0324333 7/1989 European Pat. Off. .
0276647 9/1990 European Pat. Off. .
2820630 6/1981 Fed. Rep. of Germany .
3025122 1/1982 Fed. Rep. of Germany .
3122736 10/1982 Fed. Rep. of Germany .
3117256 11/1982 Fed. Rep. of Germany .
3402323 8/1985 Fed. Rep. of Germany .
3914706 12/1989 Fed. Rep. of Germany .
0729147 4/1980 U.S.S.R. ................................ 65/34

*Primary Examiner*—Robert L. Lindsay
*Attorney, Agent, or Firm*—Young & Thompson

[57] ABSTRACT

For filling the inner space of an insulating glass panel (1) with argon, one glass pane is maintained at a distance from the spacer frame in the region of one corner (2) during pressing of the insulating glass panel (1), by holding this glass pane at a spacing from the spacer frame by pivoting of a portion (12) of the press plate (11), with the aid of suction cups (19, 20) provided at this portion (12). Through the thus-formed gap, a probe (4) for feeding argon and a probe (5) for exhausting air from the inner space of the insulating glass panel are introduced. The probe (4) blowing argon into the inner space is oriented in parallel to the lower horizontal leg of the insulating glass panel (1), and the other probe (5), exhausting air and/or air-argon mixture, exhibits an orifice pointing obliquely upwardly, i.e. away from the other probe (4). Thereby, insulating glass panels (1) can be produced with a filling of the inner space other than air without having to drill holes into the spacer frame, the gas exchange proceeding in such a way that argon is intermixed to an only quite limited extent with the air displaced from the inner space.

11 Claims, 2 Drawing Sheets

METHOD AND APPARATUS FOR FILLING THE INNER SPACE OF SEMIFINISHED INSULATING GLASS PANELS WITH GAS

FIELD OF THE INVENTION

The invention relates to a method for filling the inner space of semifinished insulating glass panels with a gas other than air, especially with argon, there being introduced into the inner space of the semifinished insulating glass panel a probe for feeding the gas and a probe for exhausting air and/or air-gas mixture from the inner space of the semifinished insulating glass panel. Such filling gases are, for example: argon or a so-called heavy gas, such as sulfur hexafluoride.

DESCRIPTION OF THE RELATED ART

A great variety of techniques has been suggested for filling the interior of insulating glass panes with a gas other than air, for example with argon or with sulfur hexafluoride. In accordance with one of the conventional modes of operation, probes for feeding the gas which is to replace the air in the inner space of the insulating glass pane and a probe for exhausting air and/or air-gas mixture are inserted through bores provided in the spacer between the glass plates of the insulating glass pane, and then the gas exchange is performed. This operating technique is disadvantageous insofar as holes must be drilled into the spacer which then must be tightly sealed again after gas exchange has been completed. Such working techniques have been known, for example, from German Patent 3,025,122, DOS 3,117,256, or U.S. Pat. No. 2,756,467. Methods for filling insulating glass panes with a special gas have also been disclosed in EP-A-276,647 and 324,333; these methods comprise the production and subsequent sealing of openings in the spacer frame.

In another mode of operation, the proposal has been advanced to exploit the circumstance that a gap is formed at the lower horizontal rim of the composed pane set between the spacer frame attached to one of the two glass panes and the (cover) glass plate leaning against this frame, after the pane sets have been assembled in devices as known, for example, from German Patent 2,820,630 or German Patent 3,122,736. It has been suggested to introduce the gas, which is to replace the air in the interior of the insulating glass pane, through this gap (Austrian Patent 368,985).

A technique wherein the gas exchange is to take place through a gap in the zone of the lower horizontal leg of a spacer frame has been known from DOS 3,402,323.

It is also known to introduce a probe for gas exchange into a roughcast insulating glass panel via an opening between the spacer frame and one of the glass panes of the roughcast insulating glass panel, this spacing being produced in the zone of its lateral edge of the roughcase insulating glass panel by lifting one glass panel off the spacer frame by means of several suction cups, with the formation of a curvature. This mode of operation is disadvantageous insofar as a curvature extending into several directions is produced and thus there is increased danger of breakage of the lifted-off glass panel. Besides, great forces are necessary for lifting the glass panel off the spacer frame.

SUMMARY OF THE INVENTION

The invention is based on the object of improving the method of the type discussed hereinabove in such a way that not only does the actual gas exchange take place in a simple and rapid fashion, but also the production and subsequent sealing of holes in the spacer frame are avoided without incurring the drawbacks of the afore-described processes wherein gas exchange occurs via a gap in the zone of the lower horizontal leg of the spacer frame.

This object has been attained according to this invention by pressing the semifinished insulating glass panel, after composing the pane pack, in a press, by holding, in the zone of a corner, a pane of the semifinished insulating glass panel at a spacing from the spacer frame, and by introducing both probes in the region of this corner into the interior of the semifinished insulating glass panel.

Due to the fact that, in the method of this invention, an opening is maintained during the pressing of the pane set, coming from the assembly station, into a semifinished insulating glass panel in the zone of a corner—the procedure being preferably such that the pane set is pressed while standing substantially vertically and one pane is held at a spacing from the spacer frame in the region of one of the lower corners—the probes for the gas exchange can be inserted without the disadvantages of the above-described, known modes of operation, even without the production of holes in the spacer frame.

Gas exchange takes place especially quickly and simply if the procedure is such that a gaseous stream oriented essentially in parallel to the lower horizontal leg of the spacer frame is blown out of the probe for feeding the gas into the inner space of the semifinished insulating glass panel. In this mode of operation, an intermixing of the introduced gas with the exhausted air and/or air-gas mixture is extensively avoided, since the gas which is to replace the air in the interior of the pane is moved in a broad front from the side lying in opposition to the feed point, advancing to the feed side, thus urging the air-gas mixture or the air gradually toward the exhaust probe under compression.

In a modification of the method according to this invention, the procedure is such that air and/or air-gas mixture is exhausted through the probe introduced into the inner space of the semifinished insulating glass panel to such an extent that, during gas exchange, a pressure is ambient in the inner space of the semifinished insulating glass panel that is higher than the pressure in the surroundings. This mode of operation has the advantage that there is no need for special sealing measures, and yet no air is sucked into the inner space of the semifinished insulating glass panel; the thus-produced losses are negligible, especially if the inner space of the semifinished insulating glass panel is filled with argon or a similarly inexpensive gas.

After termination of the gas exchange, the process of this invention can be performed so that the semifinished insulating glass panel is also subject to a compressing step in the region of the corner that was held open.

According to another version of the method of this invention, the provision is made that the probe for exhausting air and/or air-gas mixture withdraws air and-/or air-gas mixture from the inner space of the semifinished insulating glass panel with an orifice that is oriented obliquely upwardly and away from the probe for feeding gas. This embodiment reliably prevents that gas (for example argon) introduced via one probe is then immediately exhausted again via the other probe.

Since, in the method of this invention, the probes are introduced through the open region in the corner, rather than through bores, into the inner space of the semifinished insulating glass panel, these probes can be inserted, in the method of this invention, simultaneously into the inner space of the insulating glass panel even if the probes point into differing directions, for example away from each other.

The quantity of gas utilized in the method of the present invention can be determined in a simple way by continuing the gas exchange until, in the air-gas mixture exhausted via one of the probes, the proportion of air falls below a predetermined value. Alternatively, or supplementarily, the volume of the inner space of the semifinished insulating glass panel can be calculated, and an amount of gas can be introduced into the inner space into the inner space of the insulating glass panel which corresponds to the calculated volume, augmented by a predetermined fraction of this volume.

The invention furthermore relates to an apparatus especially suitable for performing the method according to this invention.

According to the invention, the apparatus for performing the method, comprising two press plates which can be made to approach each other for pressing the semifinished insulating glass panel, a probe for introducing gas into the space between the glass panes of the semifinished insulating glass panel, and a probe for exhausting air and/or air-gas mixture from the space between the glass panes of the semifinished insulating glass panel, which probes are movable on a support relatively to the semifinished insulating glass panel held between the plates of the press, is distinguished in that, in the zone of a corner of one of the plates of the press, a device is attached which engages one of the glass panes of the semifinished insulating glass panel, preferably at least one suction cup that can be placed on the outer surface of the glass pane, and in that the region of the plate where the grasping means is attached is pivotably connected to the remaining part of the plate of the pressing unit.

BRIEF DESCRIPTION OF THE DRAWINGS

Further details and features of the invention can be seen from the following description wherein reference is had to the appended drawings wherein.

Figure 1:
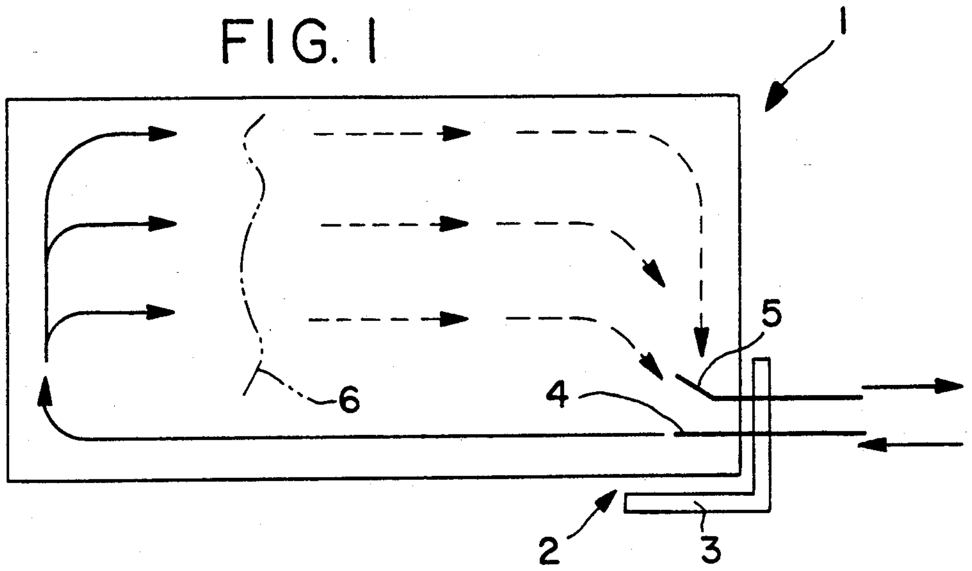
FIGS. 1–3 show three phases during gas exchange wherein air in the inner space of a semifinished insulating glass panel is replaced by a gas.

A pane set 1 coming from an assembly station wherein the cover pane leans against the spacer frame only at the top and is distanced from the spacer frame at the bottom is conveyed into a press. In the press (for example a type of structure known from German Patent 3,130,645), the pane set is pressed and, during this step, the cover pane is kept at a distance from the spacer frame and/or is lifted off the spacer frame and/or is maintained at a spacing from the spacer frame in a lower corner 2 of the pane set, preferably the leading lower corner.

Through the gap in the region of one lower corner 2, i.e. the gap that remains open during pressing of the semifinished insulating glass panel, two probes 4 and 5, mounted in close mutual proximity on an angled support 3 and effecting the gas exchange, are introduced into the inner space of the semifinished insulating glass panel. In this arrangement, the probe 4 feeding the special gas (e.g. argon) is oriented horizontally and blows the gas stream at high velocity in parallel to the lower horizontal leg of the spacer frame into the interspace between the glass panes.

The second probe 5 mounted to the angled support 3, which latter is placed from the outside against the corner 2 of the semifinished insulating glass panel l, optionally with interposition of a gasket (elastic foam material) exhibits an orifice which is oriented obliquely in the upward direction. This probe serves for exhausting air and/or air-gas mixture displaced from the inner space of the semi-finished insulating glass panel.

The gas exchange is conducted so that at all times there is at least a small excess pressure ambient in the inner space of the semifinished insulating glass panel, so that gas can be exchanged continuously and any excess air and/or gas-air mixture is displaced from the inner space; this is not a drawback since the filling gas, especially if argon is involved, is inexpensive.

Figure 2:
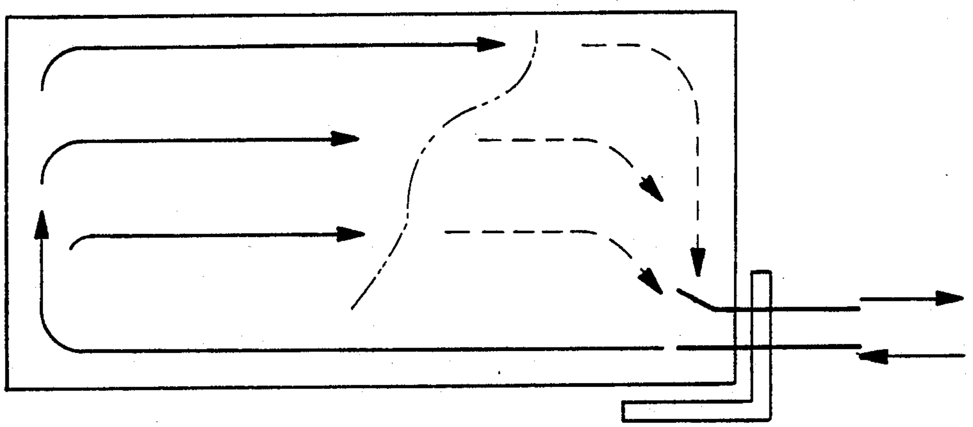
Figure 3:
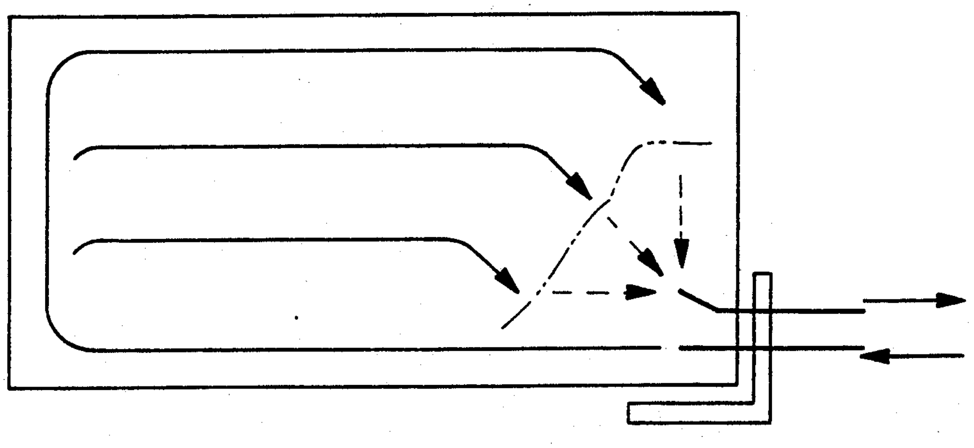

By blowing in filling gas at a high velocity in parallel to the lower horizontal leg of the spacer frame, the gaseous stream follows the inner periphery of the spacer frame and is compressed toward the center so that gradually air is compressed in an increasingly reduced zone and is displaced from the inner space of the semifinished insulating glass panel, as indicated in FIGS. 1–3 by the "front" 6 between the filling gas and the air.

The gas filling process is controlled either by measuring the residual oxygen content in the gas-air mixture withdrawn from the inner space of the semi-finished insulating glass panel, by determining the composition of the air-gas mixture in the inner space of the semifinished insulating glass panel and/or by determining (calculating) the volume of the inner space of the pane and feeding a correspondingly metered quantity of gas; a certain loss due to the ambient excess pressure is taken into account by enlarging the calculated value for the volume by a fraction determined, for example, empirically.

Advantages of the method according to this invention reside in that a continuous operation can be maintained, and there is no necessity of constantly alternating between injection and exhaustion. Also, the mode of operation according to this invention eliminates drilling and subsequent sealing of openings in the spacer frame through which the probes are to be passed. A further advantage resides in that intermixing between introduced gas and air in the inner space of the semi-finished insulating glass panel is kept within limits, since such an intermixing occurs merely to a limited extent.

Figure 4:
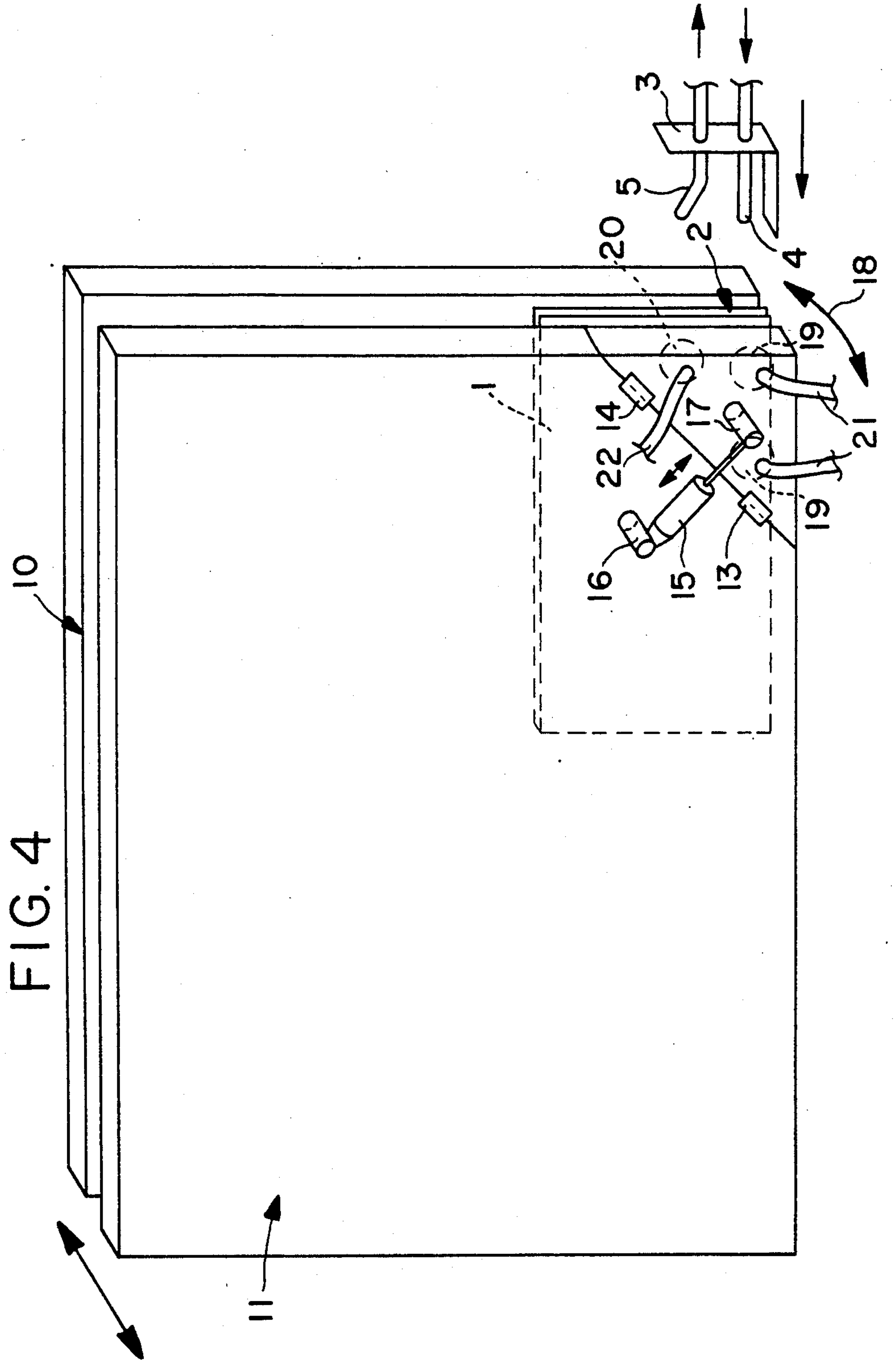
FIG. 4 shows schematically an apparatus for performing the method according to this invention.

A press indicated schematically in FIG. 4 comprises two press plates 10 and 11 movable relatively to each other, as is conventional for presses used for the compression of semi-finished insulating glass panels. The structure of the press with the plates 10 and 11 and the drive mechanism for adjusting the movable press plate, e.g. plate 11, can be of a construction as is known per se. Examples for conventional press units usable in connection with the present arrangement have been disclosed in Austrian Patent 385,499 or in Austrian Patent Application A 2956/87, published on Jun. 15, 1990. As can be seen from FIG. 4, only a lower corner region 12 of the press plate 11 is pivotable with respect to the press plate 11 and is connected to the latter via hinges 13 and 14. For pivoting the corner region 12 of the press plate 11, a pressure medium cylinder 15 is provided which is connected, on the one hand, to the press plate 11 at 16 and, on the other hand, to the corner region 12 via an extension 17 projecting from the corner region 12. By operation of the pressure medium cylinder 15, the corner region 12 can be pivoted to and from in the direction of double arrow 18 (FIG. 4).

As can be derived from FIG. 4, two suction cups 19 and 20 are provided in the illustrated embodiment in the corner region 12 of the press plate 11; these suction cups can be exposed to a vacuum via conduits 21, 22. The suction cups 19 and 20 come into contact with one of the glass panes of the semi-finished insulating glass panel 1 so that, in the corner 2 thereof, one of the glass panes is lifted off from the spacer frame disposed between the two glass panes of the semi-finished insulating glass panel 1, by operating the pressure medium cylinder 15 and pivoting corner zone 12 of press plate 11.

As soon as this has been done, the probe 4 and the probe 5 are introduced into the thus-formed aperture, the angular support 3 coming into contact with the outer periphery of the semi-finished insulating glass panel l at the semi-finished insulating glass panel 1 in the zone of the corner 2, thereof, as mentioned above. As soon as the gas exchange has taken place as described above, the support 3 with the probes 4 and 5 is removed again; for this purpose, an actuating device, not shown in detail, is provided for the mounting 3, and the pressure medium cylinder 15 is operated so that the corner zone 12 of the plate 11 is pivoted back again and thus the semi-finished insulating glass panel is pressed also in the region of the initially still open corner 2.

After the pressing step and the gas exchange have thus been terminated, the press is opened by moving the press plate 11 away from the press plate 10, and the semifinished insulating glass panel 1, thus filled with a gas, for example argon, is transferred out of the press and introduced, for instance, into a sealing station.

I claim:

1. In a method for filling the inner space of semifinished insulating glass panels, comprising at least two glass panes and an interposed spacer frame, with a gas other than air, wherein a slot-like opening is formed for feeding gas and withdrawing air and/or air-gas mixture, by holding one of the glass panes of the semifinished insulating glass panel at a spacing from the spacer frame when the semifinished insulating glass panel, after composing the pane package, is pressed while standing substantially vertically in a press between press plates, gas being blown into and air and/or air-gas mixture being withdrawn from the interior of the semifinished insulating glass panel through the thus-formed, slot-like opening, the improvement comprising: holding one of the glass panes of the semifinished insulating glass panel at a spacing from the spacer frame in the zone of only one lower corner of the semifinished insulating glass panel while retaining the remaining portion of this glass pane by the press plates in contact with the spacer frame; injecting gas into the interior of the semifinished insulating glass panel with a flow direction oriented essentially in parallel to the lower horizontal leg of the spacer frame; and withdrawing air and/or air-gas mixture form the interior of the semifinished insulating glass panel through a region of the slot-like opening lying above the region of the slot-like opening through which gas is injected into the interior of the semifinished insulating glass panel.

2. Method according to claim 1, wherein a probe oriented substantially in parallel to the lower horizontal leg of the spacer frame is used for injecting gas into the interior of the semifinished insulating glass panel.

3. Method according to claim 1, wherein the air and-/or air-gas mixture is withdrawn from the interior of the semifinished insulating glass panel to such an extent that, during gas exchange, a pressure is ambient int he interior of the semifinished insulating glass panel which is higher than the pressure in the surroundings.

4. Method according to claim 1, wherein the semifinished insulating glass panel, after gas exchange has taken place, is also pressed in the region of its corner that had been previously held open.

5. Method according to claim 1, wherein a probe arranged above the probe for injecting gas and exhibiting an obliquely upwardly directed orifice, which orifice points away from the probe for injecting gas, is used for withdrawing air and/or air-gas mixture from the interior of the semifinished insulating glass panel.

6. Method according to claim 5, wherein both probes are simultaneously placed in communication with the interior of the semifinished insulating glass panel.

7. Method according to claim 1, wherein the gas exchange is continued until the proportion of air in the withdrawn air-gas mixture falls below a predetermined value.

8. Method according to claim 1, wherein the volume of the inner space of the semifinished insulating glass panel is calculated, and a quantity of gas is introduced into the inner space of the semifinished insulating glass panel corresponding to the calculated volume augmented by a predetermined fraction of this volume.

9. Apparatus for filling the inner space of semifinished insulating glass panels consisting of at least two glass panes and an interposed spacer frame comprising: two press plates (10, 11) adapted to move relatively to each other for pressing a substantially vertically standing semifinished insulating glass panel (1), a probe (4) for introducing gas into the space between the glass panes of the semifinished insulating glass panel (1), and a probe (5) for exhausting air and/or air-gas mixture from the inner space of the semifinished insulating glass panel (1), suction means (19, 20) provided at one of the press plates (10, 11) for lifting off a lower corner region (2) of one of the glass panes of the semifinished insulating glass panel held at a spacing form the spacer frame, said suction means (19, 20) being provided in a lower corner zone (12) of one of the plates (10, 11) of the press; said lower corner zone (12) of the press plate (11) being pivotably connected to the remaining section of the press plate (11); said probes (4, 5) being carried on a joint, angled support (3), whereby the probes (4, 5) can be brought in contact, by moving the support (3), with the corner region (2) of the semifinished insulating glass panel (1); said probe (4) for injecting gas into the inner space of the semifinished insulating glass panel (1) being oriented in parallel to the lower horizontal edge of the semifinished insulating glass panel (1); and said probe (5) for exhausting air and/or air-gas mixture form the inner space of the semifinished insulating glass panel (1) has an orifice which points obliquely in the upward direction.

10. Apparatus according to claim 9, where the corner zone (12) of the press plate is pivotable with respect to the remaining section of the press plate (11) by means of a hinge-like joint (13, 14).

11. Apparatus according to claim 9, including a pressure medium cylinder (15) which engages, on the one hand, at the press plate (11) and, on the other hand, at an extension (17) projecting form the pivotable corner zone (12) of the press plate (11), for pivoting the corner zone (12) of the press plate (11).

* * * * *